Oct. 27, 1936.                V. G. APPLE                2,058,938
                             PLASTIC MOLDING
                          Filed March 17, 1928
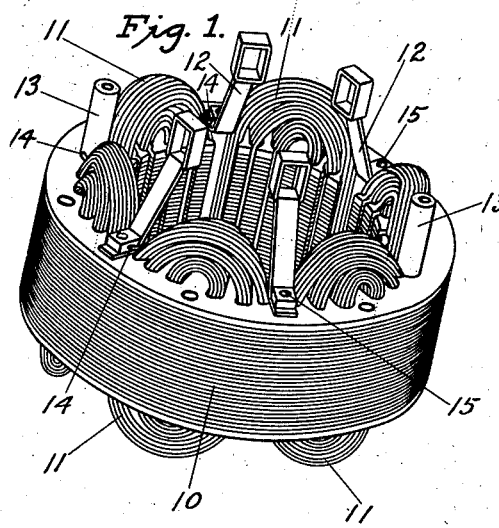
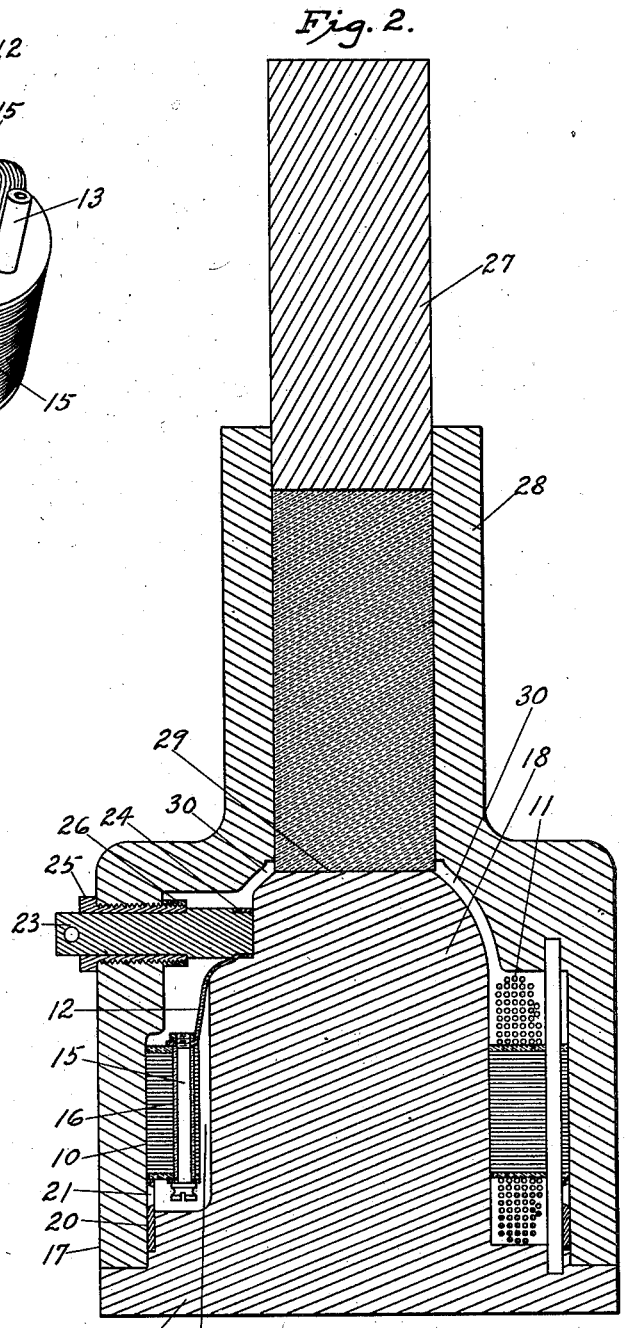
INVENTOR
Vincent G. Apple
BY
ATTORNEY Patented Oct. 27, 1936

2,058,938

UNITED STATES PATENT OFFICE 2,058,938

PLASTIC MOLDING

Vincent G. Apple, Dayton, Ohio; Herbert F. Apple, Edward M. Apple, and Gourley Darroch, executors of said Vincent G. Apple, deceased Application March 17, 1928, Serial No. 262,460

6 Claims. (Cl. 18—23)

My invention relates to plastic molding and is an improvement on the well known process which has been developed for molding synthetic resin compounds and which consists of placing a more or less immobile compound in a mold, bringing it to a plastic state therein, condensing it by lessening the space within the mold, then hardening it while in the condensed state.

This process, while originally employed for forming structures composed entirely of the moldable material, is now also generally employed in the art of uniting a number of comparatively rigid parts of a more or less complex structure by holding them in suitably spaced relation within a mold and molding fluxible material thru and about them, then solidifying the material to hold the parts in spaced relation, to bind them together, and in many instances to electrically insulate them one from another.

The foregoing process has been generally successful insofar as it has been employed to unite relatively rigid parts, but considerable difficulty has been encountered when the parts to be united were of a fragile nature, due to the inadaptability of the conventional process and its apparatus to this condition.

It is therefore the object of my invention to provide a method of procedure and such equipment for carrying it into effect as will overcome the difficulty heretofore encountered.

I attain this object by the process and equipment illustrated in the accompanying drawing wherein—

Fig. 1 shows an assembled structure comprising the core, coils and terminals of a dynamo electric machine field element.

Fig. 2 is a cross section thru a mold provided for molding a housing of plastic material about and to the structure Fig. 1.

Similar numerals refer to similar parts thruout the several views.

Heretofore molds for carrying out the process of molding plastic material thru and about a fragile structure have generally been made so that the outline of a horizontal cross section thru the mold cavity is identical with the outline of a horizontal cross section thru the structure to be molded, but the cavity is vertically several times the thickness of the finished part. The plunger for compacting the material then has the same horizontal cross section as the finished part, and its office is to take a quantity of molding compound the shape of the article to be molded, but higher, and compress it vertically to the proper height.

As is well known in the art of plastic molding, substantially the same degree of heat, continuously applied, will first flux then harden the commercial compounds used in these molds, and the degree of time and temperature at which these materials become most fluid is extremely critical.

Because of these inherent limitations of the molding material and the inadaptability of conventional methods and equipment, it is extremely difficult, in compressing the compound about a structure composed of delicate parts, to know when the material in the closed mold has reached its most fluid state.

The prior art teaches that the preferred procedure is to preheat the mold to a temperature to be determined by the quantity of material to be fluxed, so that the material afterward placed therein will draw sufficient heat therefrom to cause it to reach its most fluid state in about the time required to close the mold, that light pressure should be applied immediately to compact the material, and when the downward movement of the plunger indicates that the material is flowing, that heavy pressure should be applied to complete the operation.

Now what usually happens when the foregoing procedure is being carried out, particularly when the mass of compound placed in the mold is considerable, and the mold contains a frail structure around which the compound is to be molded is, that the portion of the compound adjacent the hot walls of the mold is not only fluxed, but is partly cured before the more remote portion of the compound has reached a fluid state, so that the operator is confronted with the alternative of risking a relatively high initial pressure which may force unfluxed material against the delicate parts to crush them, or using a lower initial pressure which will permit all of the material to be fluxed before compressing it, but at the risk that some of it may be partially cured and may be pressed against the delicate parts with the same disastrous result.

It is therefore apparent that the art as taught, and the conventional equipment used in connection therewith, is not adapted to making structures with extremely fragile parts imbedded, because such fragile parts are necessarily vertically under the plunger, and if pressure is then applied to the plunger when all the molding compound is not yet fluxed, or after some of it has begun to harden such pressure is transferred directly to the fragile parts thru the rigid material and they are crushed or displaced thereby, and since it is difficult to ascertain just when the compound is at its completely fluxed state in the closed mold, otherwise than by applying considerable pressure to the plunger and waiting for it to descend, failure is the rule rather than the exception when molding such compound thru and about a delicate structure.

To illustrate the principles of my invention I first show, in Fig. 1, a dynamo-electric machine field element, which comprises a core 10, coils 11, brush terminals 12 and line terminals 13. The coil ends are joined to the terminals 14 and the terminals are mechanically secured to the core by screws 15, tho they are electrically insulated from the core by tubular insulation 16 surrounding the screws (see Fig. 2).

After the structure Fig. 1 is provided, I place it in the mold Fig. 2, which is adapted for molding the commercial synthetic resin compounds, or any other compounds which present difficulties similar to those enumerated when applying them to delicate structures.

The cross section Fig. 2 is so taken that on one side of the vertical center line the section is between two coils and thru a brush holder, while on the other side the section is thru one of the coils. The mold comprises a body 17 bored to receive the field core 10 with its coils 11 and terminals 12 and 13 in place. A center plug 18 is formed integral with base 19, the plug being adapted to fit the bore of the core snugly and extend upwardly past the coils. A metal ring 20 holds the core raised in the mold body 17 so the coils do not rest on the base 19, the rings having perforations 21 thru which the insulation may extend to bind it to and make it a part of the completed field, wherein it may further serve as a protective coating over the molded material at the end of the core. Apertures 22 extending axially between adjacent field poles of the field core permit the moldable material to flow from the larger mass at the upper end of the core to the lesser mass at the lower end. Lateral pull bars 23 exclude the molded material from brush pockets 24 of stampings 12, and threaded sleeves 25 support threaded rings 26 into which brush spring caps may later be screwed. Plunger 27 fits snugly in the upwardly extending portion 28 of body 17, and is shown in raised position with a charge of unfluxed molding compound beneath.

It will be seen that while plunger 27 is vertically over the mold, it is not vertically over any of the crushable parts of the structure within, but is vertically over the center plug 18 only, so that a relatively high pressure may be immediately applied thereto without danger of that pressure being transmitted to the fragile parts. When then the compound becomes but slightly mobile it will move laterally over the upper end 29 of center plug 18, and since it must pass thru the relatively narrow passage 30 before it may enter the larger cavities of the mold it becomes more fluid by further contact with the mold walls, so that it may be compressed about the fragile parts more or less hydraulically, in the sense that the pressure on said parts will be nearly equal in all directions, so that the danger of their being displaced will be reduced to a minimum.

Since a housing having a closed upper end is desired the molding charge may be so regulated that the bottom of plunger 27 will stop short of the upper end 29 of center plug 18 a distance equal to the desired wall.

The operation preferably consists of placing the fragile structure in the molding chamber with the plunger in place, heating the mold to a predetermined temperature, removing the plunger from the stock chamber, placing a measured amount of unmolded material in it, returning the plunger, applying a relatively high pressure thereto, waiting till the material fluxes and then flows thru the relatively narrow passage connecting the stock and the molding chamber, maintaining a sufficient pressure and temperature for a sufficient time to bake the material, then removing the finished article from the mold.

The foregoing is the preferred order in which the several steps of the process are to be taken when any of the various commercial synthetic resin compounds are being used, yet slight variation in the manner of carrying out the process is not fatal to its success, as for instance the mold and the wound structure and the plunger may be separately heated and afterward assembled, or the mold alone may be heated and the wound structure afterward inserted to draw its heat therefrom, or the apparatus itself may include a heating means such as steam passages, electric coils, etc.

The mold herein shown has its plunger inserted from the top downward, yet it is obvious that, when the nature of the article to be made permits, the plunger may be inserted from the side horizontally, or from the bottom upward with equal results.

The article shown completed in the mold is a wound structure, yet it is apparent that the principles of my invention apply equally to the making of any article of plastic material with fragile parts, or a delicate structure imbedded therein.

While I have described a process, indicated the preferred material for carrying it into effect, and shown apparatus best suited to the preferred material, it is obvious that variation in the material being used may necessitate corresponding variation in the apparatus, the essence of the invention residing in the provision of a mold having separate molding and fluxing chambers the main or wider portion of the mold cavity being connected by a somewhat restricted and more or less tortuous passage through a relatively narrow part of the cavity itself, and the method of molding any material of the nature indicated thru and about a fragile structure by placing it in the said wider portion of the mold cavity, then placing a measured quantity of the material under the plunger of the fluxing chamber and immediately applying a pressure much higher than ordinarily used in molding the same material, to the end that the material will start thru the said relatively narrow part of the cavity as soon as it becomes slightly fluid, but may not be pressed against the fragile structure contained in the wider part of the cavity while the material is yet in a solid state.

Holding this view of the nature and scope of the invention, I claim—

1. A mold for making a dynamo electric machine element, said element comprising a body of thermoplastic thermosetting insulation in the form of an inverted cup with a magnetizable core carrying a fragile winding imbedded in the sides of the cup, said mold comprising, in combination, a base, a center plug having the form of the inside of the said inverted cup extending upwardly from said base, a mold body extending upwardly from said base, said mold body having a cavity in its lower portion of the form of the outside of said inverted cup, said cavity surrounding said center plug leaving a cup shaped molding chamber of the contour of the said inverted cup between said center plug and the wall of said cavity, the upper end of said mold body having an elongated stock chamber opening of a uniform diameter smaller than the diameter of the molding chamber extending from the top of the mold body downwardly and directly into the molding chamber, without change in diameter and a close fitting plunger vertically slidable in said stock chamber opening, the lower end of said plunger when fully inserted being as far away from the upper end of said center plug as the thickness of the bottom of the inverted cup.

2. The method of making the dynamo electric machine element defined in claim 1 in the mold therein claimed, which method consists of first supporting the core and fragile winding in the sides of the cup shaped molding chamber, next heating the mold, then placing a measured amount of unmolded thermoplastic thermosetting insulating compound in the stock chamber, inserting the plunger, applying downward pressure to said plunger thereby compacting said compound between the lower end of said plunger and the upper end of said center plug, maintaining said pressure until the compound fluxes from the heat of the mold and moves laterally from between the lower end of the plunger and the upper end of the center plug, downwardly over the sides of the center plug, around the core and winding, and further maintaining said pressure until the bottom of said plunger is as close to the top of said center plug as the thickness of the closed end of the said dynamo electric machine element, then hardening said insulation.

3. The method of molding a body of thermoplastic thermosetting insulation in the form of an inverted cup and imbedding a fragile winding of annular form in the side walls of the said cup, which consists of holding a mass of dry unmolded insulating compound sufficient for forming said inverted cup above said annular winding concentrated to a diameter smaller than the inside diameter of said annular winding and in axial alignment therewith and in the presence of heat, applying pressure to the upper end of said dry mass to move it downwardly along the axis and toward said annular winding, arresting the movement of said mass by interposing a resistance to its movement over the entire lower surface of said mass, maintaining the heat, pressure and resistance until the compound fluxes and begins to move laterally of the axis of said annular winding around said resistance and downwardly toward and around said fragile winding, continuing the downward pressure until all of said mass has moved laterally and downwardly making the sides of said cup shaped body, except enough of said mass to form the bottom of said cup shaped body, then hardening said mass.

4. In combination with a mold having a molding cavity of the form of a cup, a member having a stock chamber the diameter of which is uniform throughout its length and no larger than the inside diameter of the cup at its bottom, said stock chamber being in axial alignment with said cavity and extending through said body directly into said cavity at said bottom without change in diameter, and a plunger slidably fitted to said stock chamber.

5. In combination with a mold having a molding cavity in the form of the outside of a cup and a center plug in the form of the inside of said cup concentrically held in said cavity by one end, a member having a stock chamber no larger than the free end of said center plug and in axial alignment therewith, extending through said body directly into said cavity without change in diameter, said stock chamber ending as near the free end of said plug as the thickness of the bottom of said cup, and a plunger slidably fitted to the said stock chamber.

6. The method of making a cup of thermoplastic thermosetting material which comprises forming the material into a shape of a diameter no larger than the inside of the cup at the bottom thereof, but of a length much greater than the thickness of said bottom, confining said material around its diameter except for a small part of its length at one end, placing a plug of the form of the inside of said cup against the said end, placing a plunger of the diameter of the confined material at the other end, first applying pressure to the ends of said confined material then applying heat to said material to soften it, and maintaining said pressure until said material softens and extends laterally at said unconfined end, continuing the pressure until the length of the confined material equals the thickness of the bottom of the cup, and forming the sides of the cup of the extruded part of the material.

VINCENT G. APPLE.